(12) United States Patent
Ruan et al.

(10) Patent No.: US 12,521,923 B2
(45) Date of Patent: Jan. 13, 2026

(54) MANUFACTURING METHOD OF A TOOTHBRUSH HEAD

(71) Applicant: HI-P (XIAMEN) PRECISION PLASTIC MANUFACTURING CO., LTD., Xiamen (CN)

(72) Inventors: Ping Ruan, Xiamen (CN); Xiaojia Liu, Xiamen (CN); Qiufeng Guo, Xiamen (CN); Zhiqiang Zhang, Xiamen (CN); Yingsheng Chen, Xiamen (CN); Shuling Cui, Xiamen (CN); Baochang Ge, Xiamen (CN)

(73) Assignee: HI-P (XIAMEN) PRECISION PLASTIC MANUFACTURING CO., LTD., Xiamen (CN)

( * ) Notice: Subject to any disclaimer, the term of this patent is extended or adjusted under 35 U.S.C. 154(b) by 196 days.

(21) Appl. No.: 18/539,300

(22) Filed: Dec. 14, 2023

(65) Prior Publication Data

US 2024/0239028 A1 Jul. 18, 2024

Related U.S. Application Data

(63) Continuation of application No. PCT/CN2023/072740, filed on Jan. 17, 2023.

(51) Int. Cl.
*B29C 45/16* (2006.01)
*A46D 3/00* (2006.01)
(Continued)

(52) U.S. Cl.
CPC ........ *B29C 45/14385* (2013.01); *A46D 3/005* (2013.01); *B29C 45/1615* (2013.01); *B29C 45/1676* (2013.01); *B29L 2031/425* (2013.01)

(58) Field of Classification Search
CPC .............. B29C 45/1615; B29C 45/14385
See application file for complete search history.

(56) References Cited

U.S. PATENT DOCUMENTS

2008/0315668 A1* 12/2008 Huber ................. B29C 45/0062
15/167.1
2020/0315334 A1* 10/2020 Meidl ...................... A46B 3/04

FOREIGN PATENT DOCUMENTS

CN 103037734 A 4/2013
CN 104223758 A 12/2014
(Continued)

OTHER PUBLICATIONS

International search report of PCT patent application No. PCT/CN2023/072740 issued on Sep. 2, 2023.
(Continued)

*Primary Examiner* — Edmund H Lee
(74) *Attorney, Agent, or Firm* — Frank Niranjan

(57) ABSTRACT

Disclosed are a brush head fixture for production of a toothbrush head and a manufacturing method of the toothbrush head. The brush head fixture includes a fixture main body, a bristle accommodating part, a material sealing surface, and one or more positioning holes. The bristle accommodating part is configured for accommodating the free end of implanted bristles in the process of manufacturing the toothbrush head. The material sealing surface is located on one side of the fixture main body away from the bristle accommodating part and configured for preventing the material of the coating layer from entering the bristle accommodating part when forming the coating layer. The positioning hole penetrates through the wall of the fixture main body between the material sealing surface and the bristle accommodating part. The positioning hole is configured for injection molding the retaining part, and also for positioning the retaining part obtained through injection molding.

5 Claims, 8 Drawing Sheets

(51) Int. Cl.
*B29C 45/14* (2006.01)
*B29L 31/42* (2006.01)

(56) References Cited

FOREIGN PATENT DOCUMENTS

| | | | |
|---|---|---|---|
| CN | 209106427 U | | 7/2019 |
| CN | 114145560 A | | 3/2022 |
| CN | 114145561 A | | 3/2022 |
| DE | 102009021482 A1 | | 11/2010 |
| JP | H09182632 A | | 7/1997 |
| JP | 2001225365 A | | 8/2001 |
| JP | 2005177063 A | | 7/2005 |
| JP | 2009220123 A | | 10/2009 |
| KR | 1020120097351 A | | 9/2012 |
| KR | 101496517 | * | 2/2015 |
| TW | 201332487 A | | 8/2013 |
| TW | 201412267 A | | 4/2014 |
| WO | WO0156766 | * | 8/2001 |

OTHER PUBLICATIONS

The first office action of CN patent application No. 202310072815.X issued on Aug. 7, 2025.
The first search report of CN patent application No. 202310072815.X issued on Aug. 7, 2025.

* cited by examiner

MANUFACTURING METHOD OF A TOOTHBRUSH HEAD

TECHNICAL FIELD

This application relates to the technical field of fixture technology, and in particular, to a brush head fixture for production of a toothbrush head and manufacturing method of the toothbrush head.

BACKGROUND

A toothbrush is a daily cleaning tool that people need to use, and is usually consisted of a toothbrush head and a toothbrush handle, wherein the toothbrush head generally includes a brush head main body and bristles. In order to enhance the user experience of the toothbrushes, some toothbrush heads add a soft coating layer to the brush head main body, or add a tongue coating brush, etc. In the process of conceptualizing and implementing this application, the inventor discovered at least the following technical problem: in order to manufacture different components of a toothbrush head, multiple corresponding fixtures are required, which makes the manufacturing process of the toothbrush head complicated, and there may be size differences between different fixtures and the molds, thereby resulting in size errors between different components of the manufactured toothbrush head.

The previous description is intended to provide general background information and does not necessarily constitute prior art.

Technical Problem

In order to manufacture different components of a toothbrush head, multiple corresponding fixtures are required, which makes the manufacturing process of the toothbrush head complicated, and there may be size differences between different fixtures and the molds, thereby resulting in size errors between different components of the manufactured toothbrush head.

Technical Solution

In view of the above technical problem, this application provides a brush head fixture for production of a toothbrush head and a manufacturing method of the toothbrush head. The structural design of the brush head fixture can participate in the entire production process of the toothbrush head, to simplify the production process of the toothbrush head, improve the production efficiency of the toothbrush head, and ensure accurate size matching between various components in the manufactured toothbrush head.

In order to solve the above technical problem, the present application provides a brush head fixture for production of a toothbrush head. The toothbrush head includes a brush head main body, bristles, and a coating layer. The brush head main body includes one or more retaining parts, one end of the bristles is fixed by the retaining part, and the coating layer covers at least a portion of the brush head main body away from the free end of the bristles. The brush head fixture includes a fixture main body, a bristle accommodating part, a material sealing surface, and one or more positioning holes.

One side of the fixture main body is provided with the bristle accommodating part, and the bristle accommodating part is configured for accommodating the free end of implanted bristles during the manufacturing process of the toothbrush head.

The material sealing surface is located on one side of the fixture main body away from the bristle accommodating part, and the material sealing surface is configured for preventing the material of the coating layer from entering the bristle accommodating part when forming the coating layer.

The one or more positioning holes penetrate through the wall of the fixture main body between the material sealing surface and the bristle accommodating part, and the one or more positioning holes are configured for injection molding the retaining parts, and also for positioning the retaining parts obtained through injection molding.

Optionally, the positioning holes include first positioning holes and second positioning holes. The first positioning holes are configured for injection molding first retaining parts of the retaining parts and for positioning the first retaining parts obtained through injection molding. The first positioning holes are communicated to each other. The second positioning holes are located on a periphery of the first positioning holes and configured for injection molding second retaining parts of the retaining parts and for positioning the second retaining parts obtained through injection molding. The second positioning holes are not communicated to each other.

Optionally, after the first positioning holes are communicated to each other, one end of the hole structure is provided with a first opening. The bristle accommodating part is provided with a second opening on the side corresponding to the first opening. The first opening is communicated with the second opening.

Optionally, a partial area of the material sealing surface is configured for providing a partial wall of a molding cavity for forming connectors when injection molding the retaining parts, wherein the connectors are configured for connecting the first retaining parts and the second retaining parts.

Optionally, one side of the fixture main body away from the bristle accommodating part is recessed to form the material sealing surface; or one side of the fixture main body away from the bristle accommodating part is protruded to form the material sealing surface; or a partial area of the end surface of the fixture main body away from the bristle accommodating part serves as the material sealing surface.

Optionally, the bristle accommodating part is a cavity formed by recessing inwardly from one side of the brush head fixture, and the cavity is configured for accommodating the bristles therein.

Optionally, the material sealing surface is configured for being wrapped by a soft material used to form the coating layer during the injection molding process of the coating layer, and the material sealing surface provides a sealing function for preventing the soft material from entering the bristle accommodating part and wrapping the bristles that are accommodated in the bristle accommodating part.

Optionally, the brush head fixture is made of metal material or hard plastic.

On the other hand, the present application further provides a manufacturing method of a toothbrush head, including the following steps:

S201: a brush head fixture mentioned above is provided;

S202: the brush head fixture is fixed in a first mold to cause the wall of the positioning hole of the brush head fixture to cooperate with the first mold to form a first molding cavity, a brush head main body is formed in the first molding cavity through injection molding, and the retaining part on the brush head main body corresponds with the positioning hole and is positioned in the positioning hole;

S203: the brush head fixture and the brush head main body are removed from the first mold and then fixed in a bristle implanting fixture, the bristles are implanted and fixed in the retaining part using the bristle implanting fixture, and the free end of the bristles is accommodated in the bristle accommodating part;

S204: the combination of the brush head fixture and the brush head main body after bristle implanting is removed from the bristle implanting fixture and then is fixed in the second mold to cause a second molding cavity to be formed between the material sealing surface and the second mold, and a coating layer is formed in the second molding cavity by injection molding.

Optionally, in the step of S202, the wall of the positioning hole of the brush head fixture forms a part of the first molding cavity corresponding to the outer wall of the retaining part.

Optionally, the step of S203 includes:

by using the bristle implanting fixture, one end of the bristles is enabled to penetrate through the retaining part positioned in the positioning hole from the side of the material sealing surface and extend into the bristle accommodating part; and the end of the bristles located on the side of the material sealing surface is treated, so that the bristles are fixed in the retaining part.

Optionally, after the step of S204, the method further includes:

the combination of the brush head fixture and the brush head main body with the formed coating layer is removed from the second mold;

the brush head main body with the formed coating layer is separated from the brush head fixture.

Optionally, the material injected into the first molding cavity is a hard plastic precursor, and the material injected into the second molding cavity is a soft plastic precursor.

Beneficial Effects

The present application provides a brush head fixture for production of a toothbrush head. The toothbrush head includes a brush head main body, bristles, and a coating layer. The brush head main body includes one or more retaining parts, one end of the bristles is fixed by the retaining part, and the coating layer covers at least a portion of the brush head main body that is away from the free end of the bristles. The brush head fixture includes a fixture main body, a bristle accommodating part, a material sealing surface, and one or more positioning holes. One side of the fixture main body is provided with the bristle accommodating part, and the bristle accommodating part is configured for accommodating the free end of implanted bristles during the manufacturing process of the toothbrush head. The material sealing surface is located on one side of the fixture main body away from the bristle accommodating part, and the material sealing surface is configured for preventing the material of the coating layer from entering the bristle accommodating part when forming the coating layer. The positioning hole penetrates through the wall of the fixture main body between the material sealing surface and the bristle accommodating part. The positioning hole is configured for injection molding the retaining part, and also for positioning the retaining part obtained through injection molding. The brush head fixture in the present application includes parts corresponding to the brush head main body, the bristles and the coating layer, and one brush head fixture can be used to participate in the entire production process of the toothbrush head, thereby simplifying the production process of the toothbrush head, improving the production efficiency of the toothbrush head, and ensuring accurate size matching between various components in the manufactured toothbrush head.

The manufacturing method of a toothbrush head according to present application includes: a brush head fixture is provided; the brush head fixture is fixed in a first mold to cause the wall of the positioning hole of the brush head fixture to cooperate with the first mold to form a first molding cavity, a brush head main body is formed in the first molding cavity through injection molding, and the retaining part on the brush head main body corresponds with the positioning hole and is positioned in the positioning hole; the brush head fixture and the brush head main body are removed from the first mold and then fixed in a bristle implanting fixture, the bristles are implanted and fixed in the retaining part using the bristle implanting fixture, and the free end of the bristles is accommodated in the bristle accommodating part; the combination of the brush head fixture and the brush head main body after bristle implanting is removed from the bristle implanting fixture and then is fixed in the second mold to cause a second molding cavity to be formed between the material sealing surface and the second mold, and a coating layer is formed in the second molding cavity by injection molding. The brush head fixture in the present application participates in the entire production process of the toothbrush head, thereby simplifying the production process of the toothbrush head, ensuring accurate size matching between various components in the manufactured toothbrush head, and improving the production efficiency of the toothbrush head.

In the figures: 10—brush head main body; 11—bristles; 12—coating layer; 13—retaining part; 131—first retaining part; 132—connector; 133—second retaining part; 134—fixing hole; 30—fixture main body; 31—bristle accommodating part; 32—material scaling surface; 33—positioning hole; 331—first positioning hole; 332—second positioning hole.

DETAILED DESCRIPTION OF THE EMBODIMENTS

The following are specific embodiments to illustrate the implementation of this application. Those familiar with this technology can easily understand the other advantages and effects of this application from the content disclosed in this specification.

In the following description, reference is made to the accompanying drawings, which describe several embodiments of the present application. It should be understood that other embodiments can also be used, and changes in mechanical composition, structure, electricity and operation can be made without departing from the spirit and scope of the present application. The detailed description below should not be considered restrictive, and the terminology used herein is only for the purpose of describing specific embodiments and therefore is not intended to limit this application.

Although the terms "first", "second", etc. are used in some examples to describe various components in this description, these components should not be limited by these terms, and these terms are only used to distinguish one component from another.

Further, as used in this description, the singular forms "one", "a", and "the" are intended to also include the plural form, unless the context indicates otherwise. It should be further understood that the terms "including" and "comprising" indicate the existence of the described features, steps, operations, elements, components, items, types, and/or groups, but do not exclude the existence, appearance, or addition of one or more other features, steps, operations, elements, components, items, types, and/or groups. The terms "or" and "and/or" used herein are interpreted as inclusive or imply any one or any combination. Therefore, "A, B, or C" or "A, B, and/or C" means "any of the following: A; B; C; A and B; A and C; B and C; A, B, and C. Exceptions to this definition only occur when combinations of components, functions, steps, or operations are inherently mutually exclusive in certain ways.

First Embodiment

Figure 1:
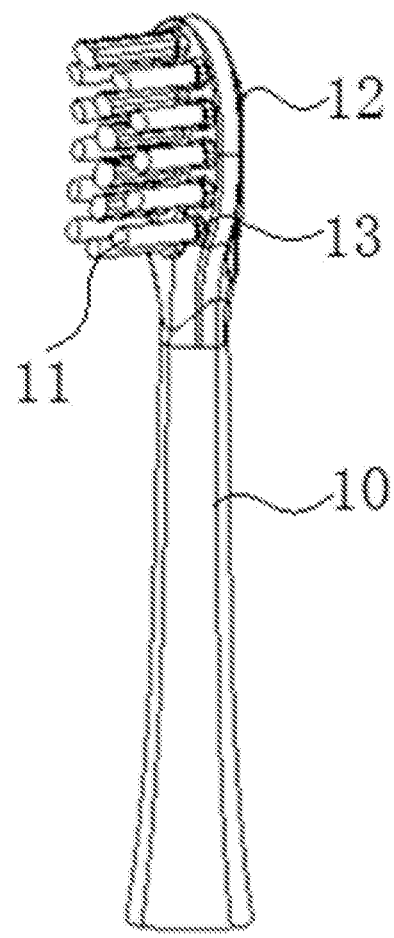
FIG. 1 is a structural schematic diagram of a toothbrush head according to the first embodiment of the present application.
Figure 2:
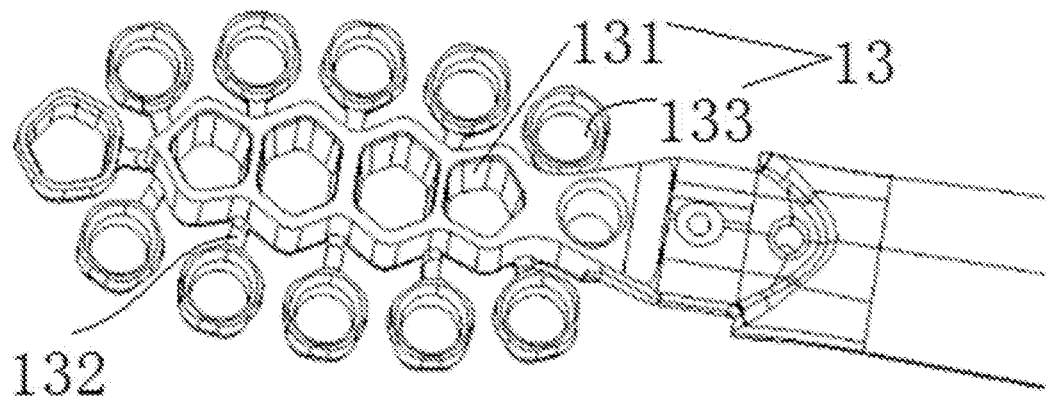
FIG. 2 is a structural schematic diagram of a brush head main body according to the first embodiment of the present application.

FIG. 1 is a structural schematic diagram of a toothbrush head according to the first embodiment of the present application. FIG. 2 is a structural schematic diagram of a brush head main body according to the first embodiment of the present application. As shown in FIGS. 1 and 2, the toothbrush head includes a brush head main body 10, bristles 11, and a coating layer 12. The brush head main body 10 includes one or more retaining parts 13. One end of the bristles 11 is fixed by the retaining part 13. The coating layer 12 covers at least a portion of the brush head main body 10 that is away from the free end of the bristles 11.

Figure 3:
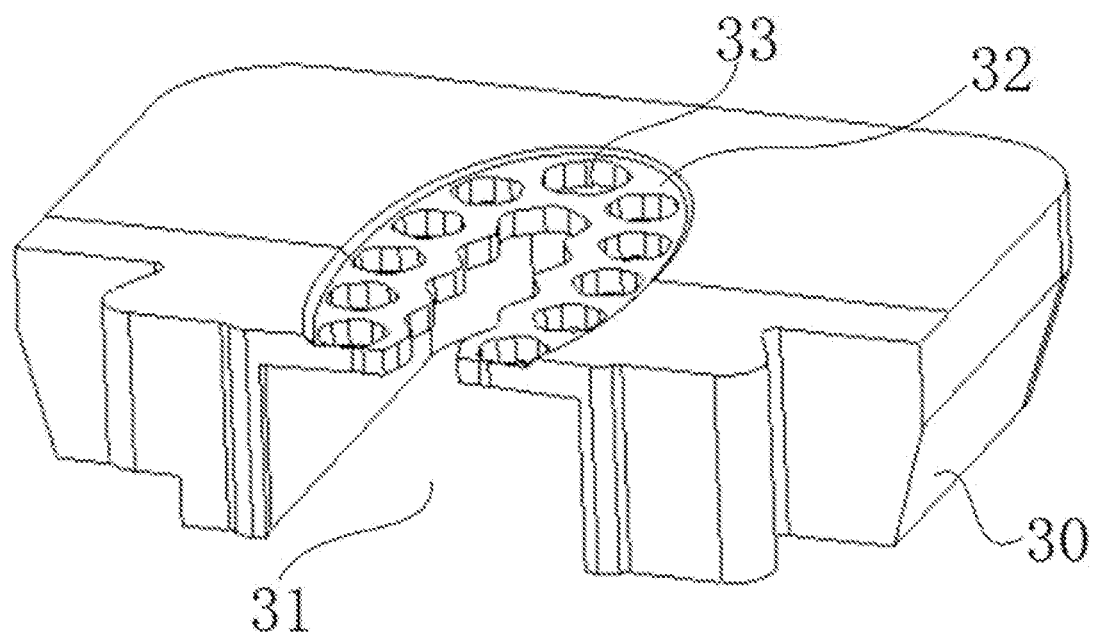
FIG. 3 is a structural schematic diagram of a brush head fixture according to the first embodiment of the present application.
Figure 4:
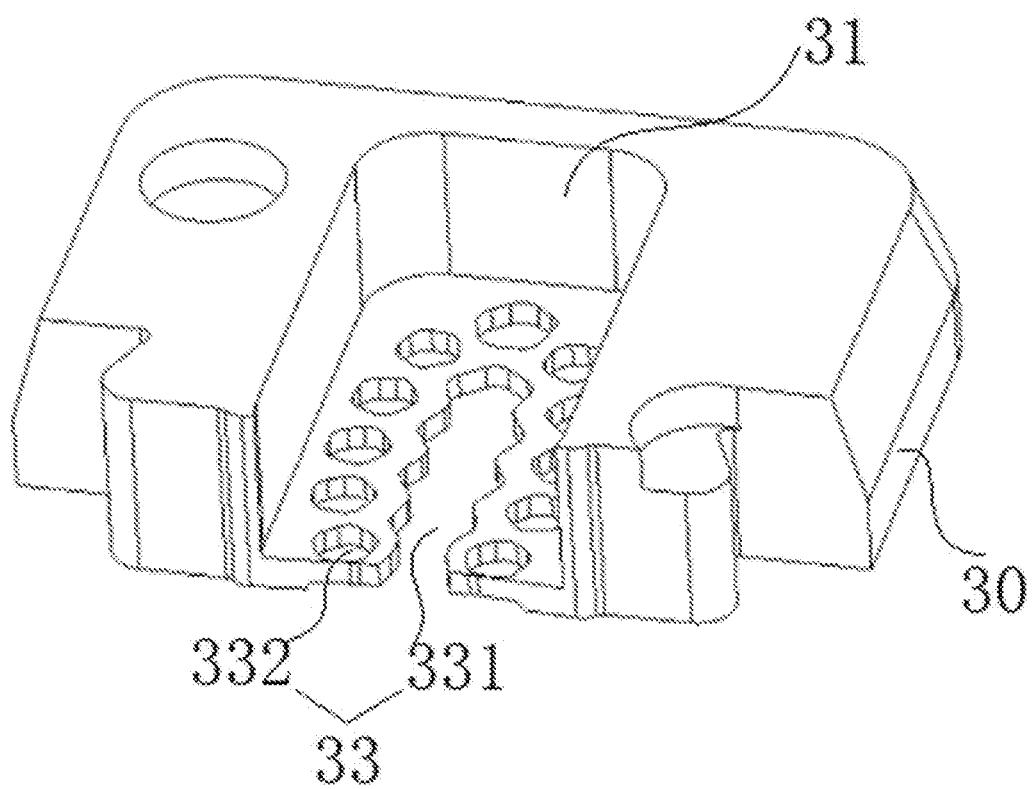
FIG. 4 is another structural schematic diagram of the brush head fixture according to the first embodiment of the present application.

As shown in FIGS. 3 and 4, the brush head fixture for production of toothbrush heads according to this embodiment can be used for production of the toothbrush head with the above structure. The brush head fixture includes a fixture main body 30, a bristle accommodating part 31, a material scaling surface 32, and one or more positioning holes 33.

One side of the fixture main body 30 is provided with the bristle accommodating part 31, and the bristle accommodating part 31 is configured for accommodating the free end of implanted bristles 11 during the manufacturing process of the toothbrush head. The material scaling surface 32 is located on one side of the fixture main body 30 away from the bristle accommodating part 31, and the material scaling surface 32 is configured for preventing the material of the coating layer 12 from entering the bristle accommodating part 31 when forming the coating layer 12. The one or more positioning holes 33 penetrate through the wall of the fixture main body 30 between the material sealing surface 32 and the bristle accommodating part 31. The one or more positioning holes 33 are configured for injection molding the retaining parts 13, and also for positioning the retaining parts 13 obtained through injection molding.

In this embodiment, the brush head fixture is made of metal material or hard plastic, which has high hardness and strength. When placed in the molding cavity for injection molding the toothbrush head, the brush head fixture can resist the large injection pressure inside the molding cavity and maintain dimensional stability, and the brush head fixture can be reused.

Figure 5:
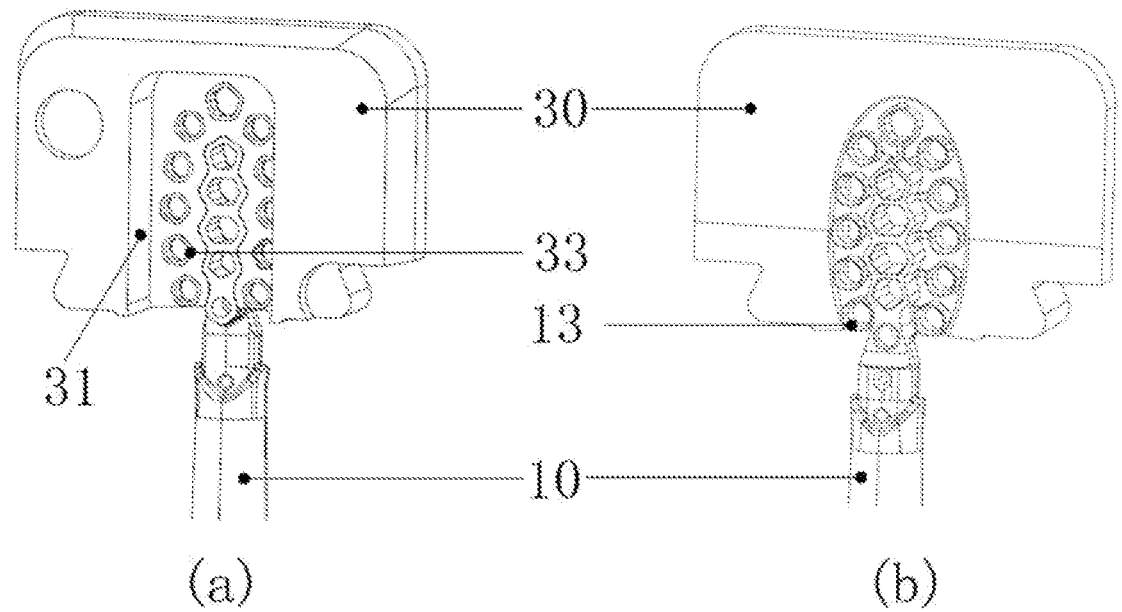
FIG. 5 is a schematic diagram of the combination of the brush head main body and the brush head fixture according to the first embodiment of the present application.

Referring to FIGS. 2, 3, and 5, FIG. 5(a) is a schematic diagram of the combination of the brush head main body and the brush head fixture from one side, and FIG. 5(b) is a schematic diagram of the combination of the brush head main body and the brush head fixture from the other side. The positioning holes 33 in the brush head fixture correspond to the retaining parts 13. Specifically, the positioning holes 33 penetrate through the wall of the fixture main body 30 between the material scaling surface 32 and the bristle accommodating part 31. The positioning holes 33 are configured for injection molding the retaining parts 13, and the injection molding material enters the molding cavity to form the retaining parts 13. In addition, the positioning holes 33 are also configured for positioning the retaining parts 13 obtained through injection molding. After first injection molding to form the brush head main body 10, the positioning holes 33 fixes the formed retaining parts 13 in the positioning holes 33, preventing the position of the retaining parts 13 from moving, to reduce assembly errors during the manufacturing process and facilitate the subsequent manufacturing processes to be conducted smoothly.

As one of the embodiments, the depth of the positioning holes 33 can be selected to be less than the height of the retaining parts 13, so that the retaining parts 13 in the toothbrush head can be integrated with the bristles 11 and the coating layer 12.

As one of the embodiments, the retaining parts 13 include first retaining parts 131 and second retaining parts 133. The first retaining parts 131 are located in the middle and lower portion of the brush head main body 10 and are connected to each other. The second retaining parts 133 are located on the periphery of the brush head main body 10 and are independent of each other. The second retaining parts 133 are connected to the first retaining parts 131 through connectors 132. Correspondingly, the positioning holes 33 include first positioning holes 331 and second positioning holes 332. The first positioning holes 331 correspond to the first retaining parts 131, and the first positioning holes 331 are communicated to each other. The second positioning holes 332 are located on the periphery of the first positioning holes 331 and correspond to the second retaining parts 133, and the second positioning holes 332 are not communicated to each other. In this way, the positioning holes 33 can be used for injection molding the first retaining parts 131 and the second retaining parts 133 during the injection molding process of the toothbrush head, and the first retaining parts 131 and the second retaining parts 133 can be obtained by carrying out injection molding in the molding cavity formed between the positioning holes 33 and the mold of forming the brush head main body 10.

As one of the embodiments, the second retaining parts 133 are connected to the first retaining parts 131 through the connectors 132. A partial area of the material scaling surface 32 is also configured for providing a partial wall of the molding cavity for forming the connectors 132 when injection molding the retaining parts 13. The connectors 132 are located between the first retaining parts 131 and the second retaining parts 133. Since both the first retaining parts 131 and the second retaining parts 133 correspond one-to-one with the positioning holes 33, the positioning holes 33 can be used for injection molding the first retaining parts 131 and the second retaining parts 133 during the injection molding process of the toothbrush head. The positioning holes 33 penetrate through the material sealing surface 32, and by providing a partial wall of the molding cavity using the material sealing surface 32 when injection molding the connectors 132, the connectors 132 can be simultaneously obtained by carrying out injection molding in the molding cavity that is formed between the material sealing surface 32 and the mold of forming the brush head main body 10.

As one of the embodiments, after the first positioning holes 331 are communicated to each other, one end of the hole structure is provided with a first opening. The bristle accommodating part 31 is provided with a second opening on the side corresponding to the first opening. The first opening is communicated with the second opening. This design can be used for the integral formation of the brush head main body and a brush handle, thereby facilitating the manufacturing of the brush head fixture and facilitating the smooth demolding of the manufactured toothbrush head from the brush head fixture.

Figure 6:
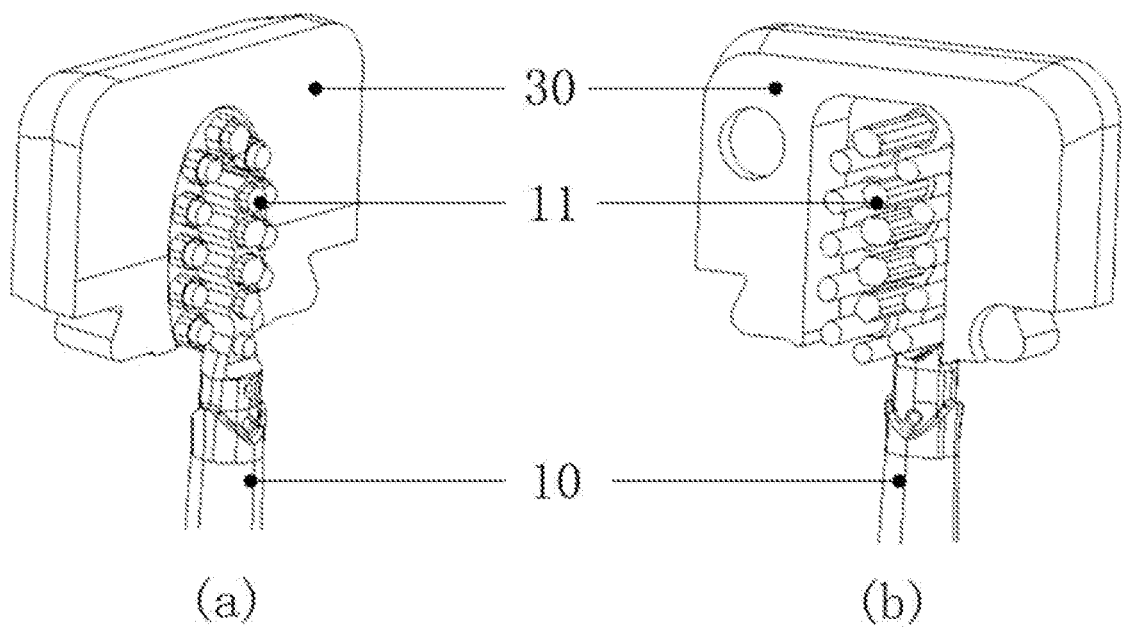
FIG. 6 is a schematic diagram of the combination of the toothbrush head with bristles and the brush head fixture according to the first embodiment of the present application.

Referring to FIGS. 2, 3, and 6, FIG. 6(a) is a schematic diagram of the combination of the toothbrush head with bristles and the brush head fixture from one side, and FIG. 6(b) is a schematic diagram of the combination of the toothbrush head with bristles and the brush head fixture from the other side. During the bristle implanting process and the second injection molding process of the coating layer 12, the bristle accommodating part 31 of the brush head fixture is configured for accommodating the free end of the bristles 11 in the bristle accommodating part 31, which can prevent the bristle implanting fixture or the second mold from crushing or scalding the bristles 11. Preferably, the shape of the bristle accommodating part 31 can be a cavity formed by recessing inwardly from one side of the brush head fixture, and the bristles 11 are accommodated in the cavity. In other embodiments, one side of the fixture main body 30 can also be a plane, the brush head fixture is placed in the fixture for the bristle implanting process (referred to as the bristle implanting fixture) or in the mold for the second injection molding process of the coating layer 12 (referred to as the second mold), and the plane as the bristle accommodating part can cooperate with the bristle implanting fixture or the second mold to form a cavity for accommodating the bristles.

Figure 7:
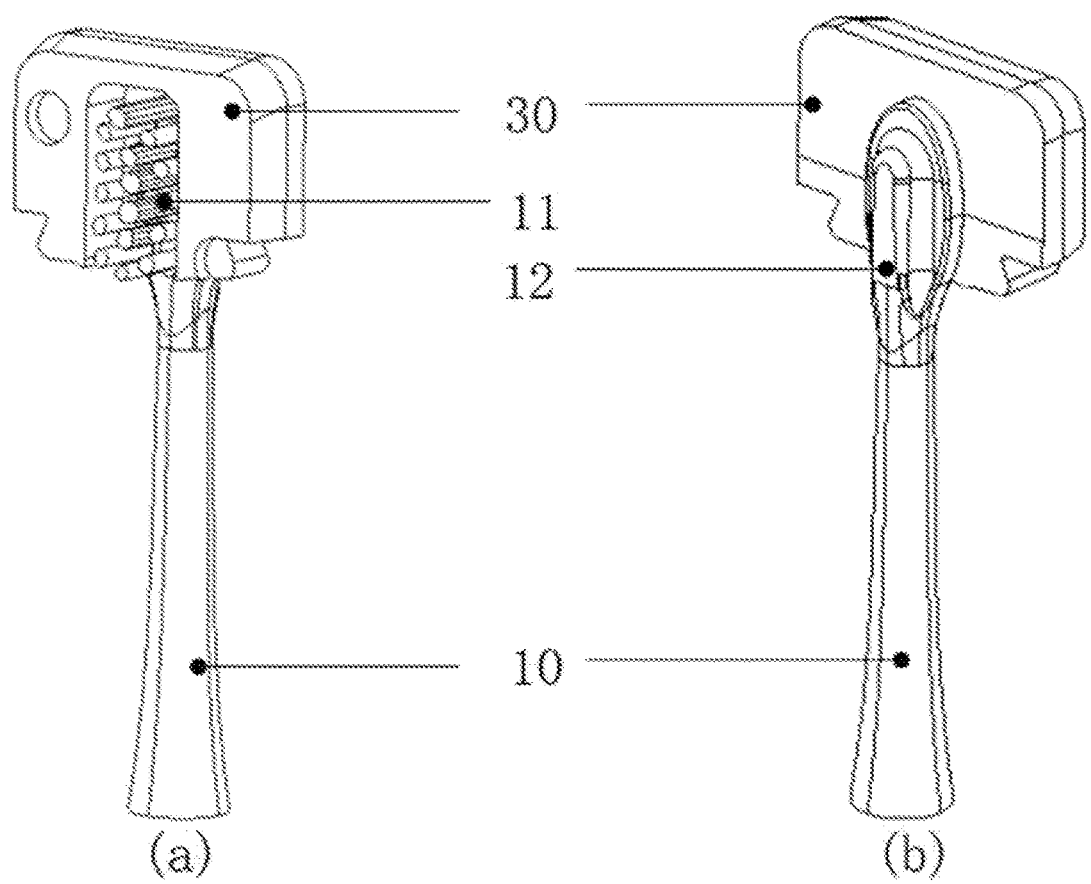
FIG. 7 is a schematic diagram of the combination of the toothbrush head with a coating layer and the brush head fixture according to the first embodiment of the present application.
Figure 8:
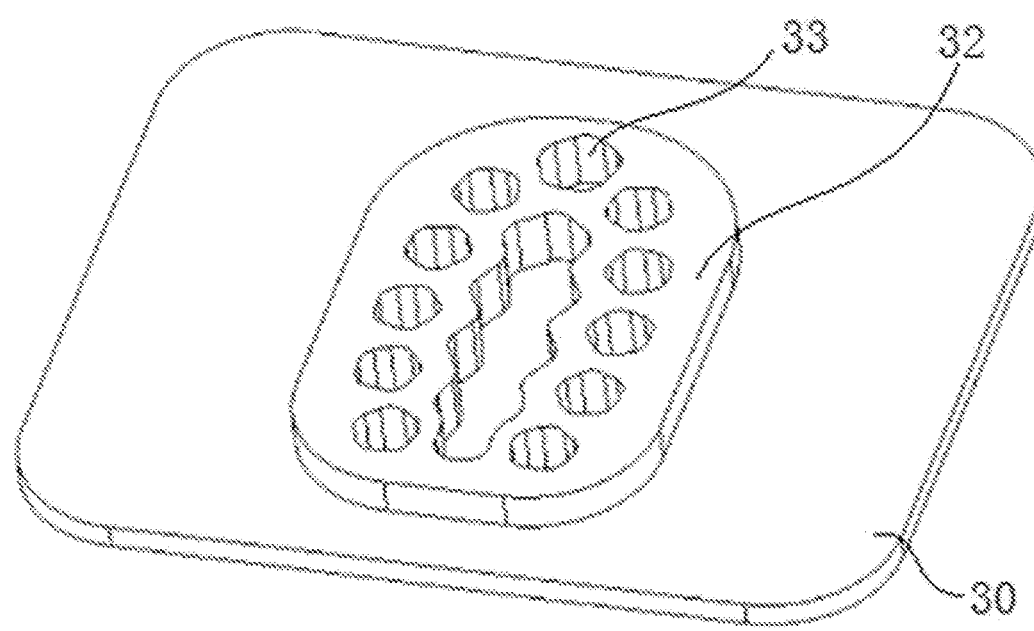
FIG. 8 is a structural schematic diagram of another brush head fixture according to the first embodiment of the present application.

Referring to FIGS. 1, 3, and 7, FIG. 7(a) is a schematic diagram of the combination of the toothbrush head with a coating layer and the brush head fixture from one side, and FIG. 7(b) is a schematic diagram of the combination of the toothbrush head with the coating layer and the brush head fixture from the other side. During the injection molding process of the soft material coating layer 12, the soft material wraps the material sealing surface 32 of the brush head fixture, so that the material sealing surface 32 provides a scaling function to prevent the soft material from entering the bristle accommodating part 31. As shown in FIG. 3, the shape of the area where the material scaling surface 32 is located matches the shape of the toothbrush head, and one side of the fixture main body 30 away from the bristle accommodating part 31 is recessed to form the material sealing surface 32. In this way, it is convenient for the material sealing surface 32 to cooperate with the second mold to form a molding cavity for injection molding the coating layer 12. In another embodiment, as shown in FIG. 8, one side of the fixture main body 30 away from the bristle accommodating part 31 is protruded to form the material sealing surface 32. In this way, it is convenient for the material sealing surface 32 to cooperate with a corresponding portion of the second mold to form a molding cavity for injection molding the coating layer 12. In other embodiments, a partial area of the fixture main body 30 away from the bristle accommodating part 31 serves as the material sealing surface 32. This facilitates the manufacturing of the toothbrush head.

The embodiments of the present application provide a brush head fixture for production of a toothbrush head. The toothbrush head includes a brush head main body, bristles, and a coating layer. The brush head main body includes one or more retaining parts, one end of the bristles is fixed by the retaining part, and the coating layer covers at least a portion of the brush head main body that is away from the free end of the bristles. The brush head fixture includes a fixture main body, a bristle accommodating part, a material sealing surface, and one or more positioning holes. One side of the fixture main body is provided with the bristle accommodating part, and the bristle accommodating part is configured for accommodating the free end of implanted bristles during the manufacturing process of the toothbrush head. The material sealing surface is located on one side of the fixture main body away from the bristle accommodating part, and the material scaling surface is configured for preventing the material of the coating layer from entering the bristle accommodating part when forming the coating layer. The positioning holes penetrate through the wall of the fixture main body between the material sealing surface and the bristle accommodating part. The positioning holes are configured for injection molding the retaining parts, and also for positioning the retaining parts obtained through injection molding. In this way, the brush head fixture includes parts corresponding to the brush head main body, the bristles and the coating layer, and one brush head fixture can be used to participate in the entire production process of the toothbrush head, thereby simplifying the production process of the toothbrush head, improving the production efficiency of the toothbrush head, and ensuring accurate size matching between various components in the manufactured toothbrush head.

Second Embodiment

Figure 9:
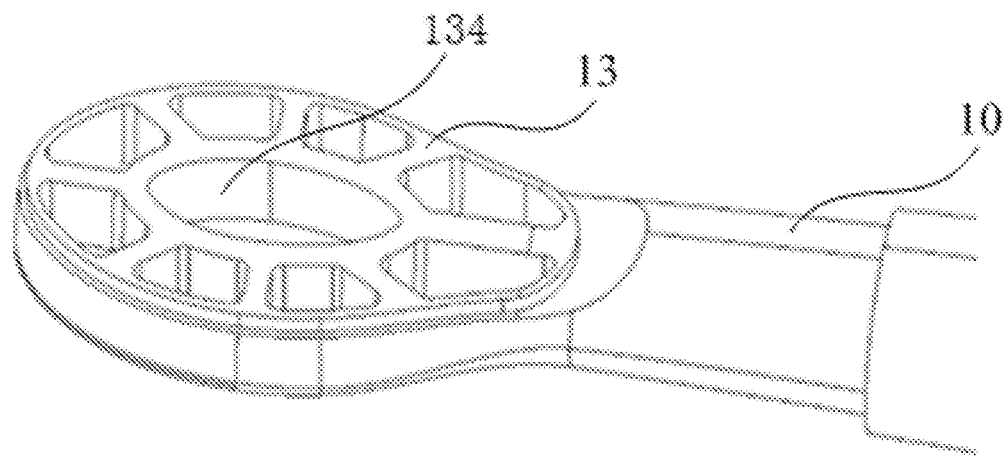
FIG. 9 is a structural schematic diagram of a brush head main body according to the second embodiment of the present application.

FIG. 9 is a structural schematic diagram of a brush head main body according to the second embodiment of the present application. As shown in FIG. 9, unlike the brush head main body of the first embodiment, the brush head main body 10 of this embodiment includes a retaining part 13, and the retaining part 13 is provided with a plurality of fixing holes 134. When making a toothbrush head, one end of the bristles 11 is fixed in a fixing hole 134 on the retaining part 13, and the coating layer 12 covers at least a portion of the brush head main body 10 that is away from the free end of the bristles 11.

Figure 10:
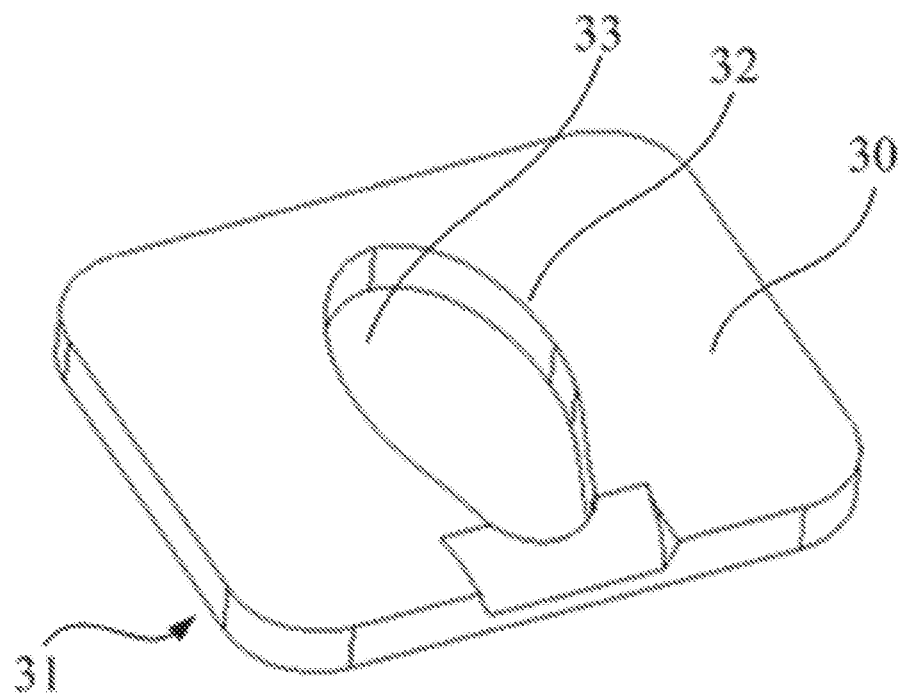
FIG. 10 is a structural schematic diagram of a brush head fixture according to the second embodiment of the present application.
Figure 11:
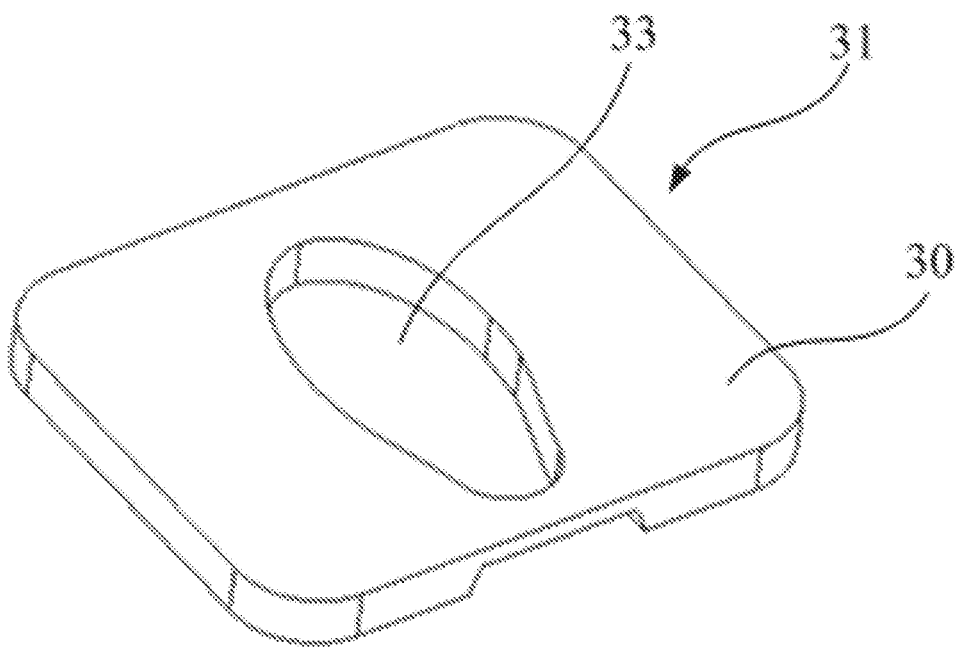
FIG. 11 is another structural schematic diagram of the brush head fixture according to the second embodiment of the present application.

As shown in FIGS. 10 and 11, the brush head fixture for production of toothbrush heads in this embodiment of the present application can be used for production of the toothbrush head with the above-mentioned structure of the brush head main body 10. The brush head fixture includes a fixture main body 30, a bristle accommodating part 31, a material sealing surface 32, and a positioning hole 33.

One side of the fixture main body 30 is provided with the bristle accommodating part 31, and the bristle accommodating part 31 is configured for accommodating the free end of implanted bristles 11 during the manufacturing process of the toothbrush head. The material sealing surface 32 is located on one side of the fixture main body 30 away from the bristle accommodating part 31, and the material sealing surface 32 is configured for preventing the material of the coating layer 12 from entering the bristle accommodating part 31 when forming the coating layer 12. The positioning hole 33 penetrates through the wall of the fixture main body 30 between the material sealing surface 32 and the bristle accommodating part 31. The positioning hole 33 is configured for injection molding the retaining part 13, and also for positioning the retaining part 13 obtained through injection molding. In this embodiment, the material sealing surface 32 is an area surrounding the positioning hole 33 on one side of the fixture main body 30 away from the bristle accommodating part 31.

In this embodiment, the brush head fixture is made of metal material or hard plastic, which has high hardness and strength. When placed in the molding cavity for injection molding the toothbrush head, the brush head fixture can resist the large injection pressure inside the molding cavity and maintain dimensional stability, and the brush head fixture can be reused.

Figure 12:
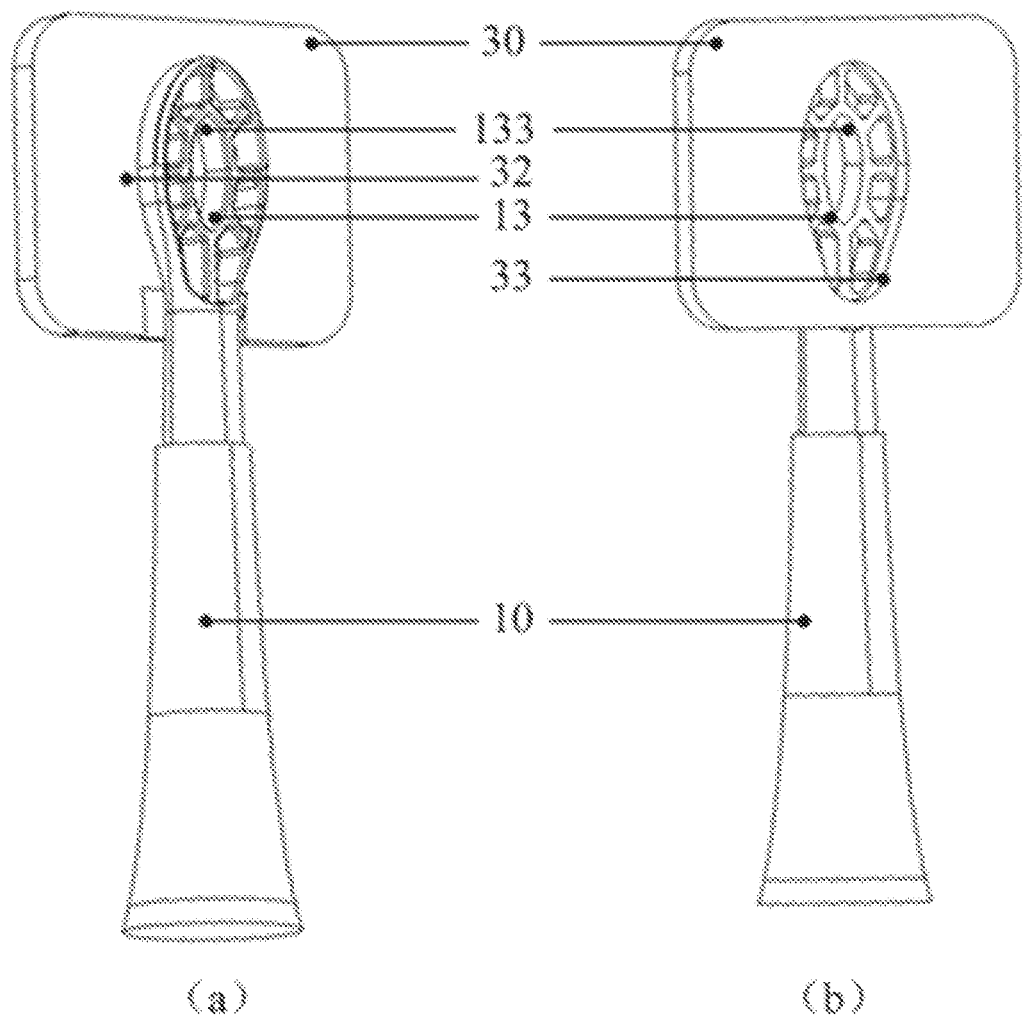
FIG. 12 is a schematic diagram of the combination of the brush head main body and the brush head fixture according to the second embodiment of the present application.

As shown in FIG. 12, FIG. 12(a) is a schematic diagram of the combination of the brush head main body and the brush head fixture from one side, and FIG. 12(b) is a schematic diagram of the combination of the brush head main body and the brush head fixture from the other side. The positioning hole 33 in the brush head fixture corresponds to the retaining part 13. Specifically, the positioning hole 33 penetrates through the wall of the fixture main body 30 between the material sealing surface 32 and the brush retaining part 31. The positioning hole 33 is configured for injection molding the retaining part 13, and the injection molding material enters the molding cavity to form the retaining part 13. In addition, the positioning hole 33 is also configured for positioning the retaining part 13 obtained through injection molding. After first injection molding to form the brush head main body 10 by the positioning hole 33, a part of the outer wall of the retaining part 13 matches with the positioning hole 33 of the brush head fixture, and the formed retaining part 13 is fixed in the positioning hole 33 to prevent the position of the retaining part 13 from moving, to reduce assembly errors during the manufacturing process and facilitate the subsequent manufacturing processes to be conducted smoothly. At the same time, the fixing holes 134 in the retaining part 13 have also been positioned.

During the bristle implanting process and the second injection molding process of the coating layer 12, the bristle accommodating part 31 of the brush head fixture is configured for accommodating the free end of the bristles 11 in the bristle accommodating part 31, which can prevent the bristle implanting fixture or the second mold from crushing or scalding the bristles 11. Preferably, the shape of the bristle accommodating part 31 can be a cavity formed by recessing inwardly from one side of the fixture main body 30, and the bristles 11 are accommodated in the cavity. In other embodiments, one side of the fixture main body 30 can also be a plane, the brush head fixture is placed in the fixture for the bristle implanting process (referred to as the bristle implanting fixture), or in the mold for the second molding process of the coating layer 12 (referred to as the second mold), and the plane as the bristle accommodating part 31 can cooperate with the bristle implanting fixture or the second mold to form a cavity for accommodating the bristles. In this section, the cooperation manner in which the brush head fixture cooperates with the brush head main body and the bristle implanting fixture is similar to that of the first embodiment, and will not be repeated.

During the injection molding process of the soft material coating layer 12, the soft material wraps the material sealing surface 32 of the brush head fixture, so that the material sealing surface 32 provides a scaling and stopping function to prevent the soft material from entering the bristle accommodating part 31. As shown in FIG. 10, in this embodiment, the material sealing surface 32 is the area surrounding the positioning hole 33 on one side of the fixture main body 30 away from the bristle accommodating part 31, and this area can be flat, concave or convex, so long as the material scaling surface 32 can cooperate with a corresponding portion of the second mold to form a molding cavity for injection molding the coating layer 12. In this section, the cooperation manner in which the brush head fixture cooperates with the brush head main body and the second mold is similar to that of the first embodiment, and will not be repeated.

The embodiments of the present application provide a brush head fixture for production of a toothbrush head. The toothbrush head includes a brush head main body, bristles, and a coating layer. The brush head main body includes a retaining part, one end of the bristles is fixed by the retaining part, and the coating layer covers at least a portion of the brush head main body that is away from the free end of the bristles. The brush head fixture includes a fixture main body, a bristle accommodating part, a material sealing surface, and a positioning hole. One side of the fixture main body is provided with the bristle accommodating part, and the bristle accommodating part is configured for accommodating the free end of implanted bristles during the manufacturing process of the toothbrush head. The material scaling surface is located on one side of the fixture main body away from the bristle accommodating part, and the material sealing surface is configured for preventing the material of the coating layer from entering the bristle accommodating part when forming the coating layer. The positioning hole penetrates through the wall of the fixture main body between the material scaling surface and the bristle accommodating part. The positioning hole is configured for injection molding the retaining part, and also for positioning the retaining part obtained through injection molding. In this way, the brush head fixture includes parts corresponding to the brush head main body, the bristles and the coating layer, and one brush head fixture can be used to participate in the entire production process of the toothbrush head, thereby simplifying the production process of the toothbrush head, improving the production efficiency of the toothbrush head, and ensuring accurate size matching between various components in the manufactured toothbrush head.

Third Embodiment

Figure 13:
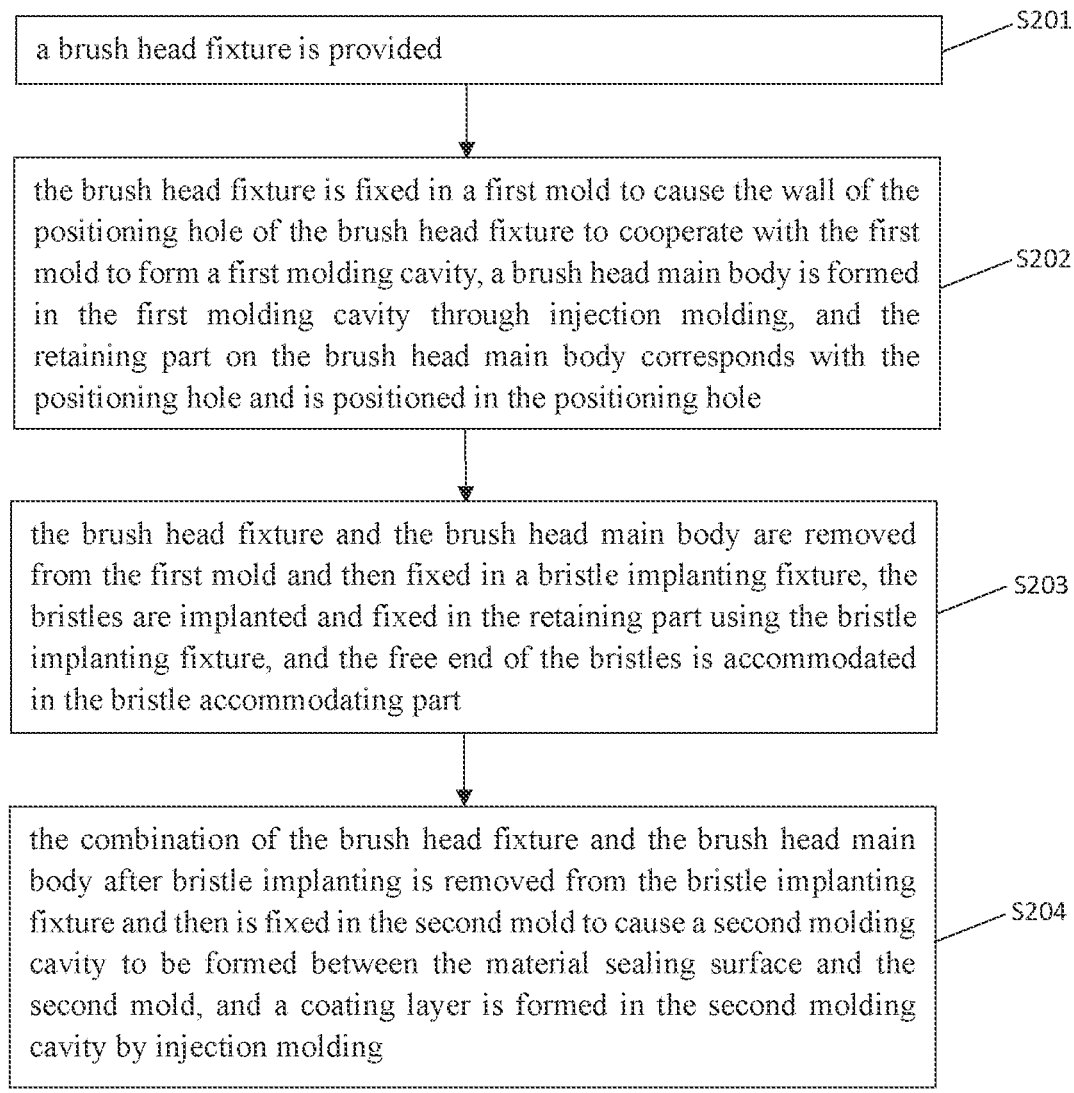
FIG. 13 is a flowchart of the manufacturing method of a toothbrush head according to the third embodiment of the present application.

FIG. 13 is a flowchart of the manufacturing method of a toothbrush head according to the third embodiment of the present application. As shown in FIG. 13, the manufacturing method of the toothbrush head of this embodiment includes the following steps:

Step S201: a brush head fixture is provided.

The structure of the brush head fixture is described in the first or second embodiment, and will not be further repeated.

Step S202: the brush head fixture is fixed in a first mold to cause the wall of the positioning hole 33 of the brush head fixture to cooperate with the first mold to form a first molding cavity, a brush head main body 10 is formed in the first molding cavity through injection molding, and the retaining parts 13 on the brush head main body 10 correspond with the positioning holes 33 and are positioned in the positioning hole 33.

Specifically, the wall of the positioning hole 33 of the brush head fixture cooperates with the first mold to form the first molding cavity, that is, the wall of the positioning hole 33 is a part of the first molding cavity. After the brush head main body 10 is formed by injection molding in the first molding cavity, the retaining part 13 is then positioned in the positioning hole 33 with high positioning precision.

Taking the brush head main body and the brush head fixture described in the first embodiment as an example, as shown in FIG. 5, FIG. 5(a) is a schematic diagram of the combination of the brush head main body and the brush head fixture from one side, and FIG. 5(b) is a schematic diagram of the combination of the brush head main body and the brush head fixture from the other side. After the brush head fixture is fixed in the first mold, the wall of the positioning holes 33 cooperate with the first mold to form a first molding cavity, and the brush head main body 10 is formed by injection molding in the first molding cavity. The retaining parts 13 thus obtained correspond one-to-one with the positioning holes 33 and are fixed in the positioning holes 33.

Taking the brush head main body and the brush head fixture described in the second embodiment as an example, as shown in FIG. 12, FIG. 12(a) is a schematic diagram of the combination of the brush head main body and the brush head fixture from one side, and FIG. 12(b) is a schematic diagram of the combination of the brush head main body and the brush head fixture from the other side. After the brush head fixture is fixed in the first mold, the wall of the positioning hole 33 cooperates with the first mold to form a first molding cavity, and the brush head main body 10 is formed by injection molding in the first molding cavity. The retaining part 13 thus obtained corresponds to the position of the positioning hole 33 and is fixed in the positioning hole 33.

As one of the embodiments, in the step of S202, the wall of the positioning hole 33 of the brush head fixture forms a part of the first molding cavity corresponding to the outer wall of the retaining part 13.

Specifically, the brush head fixture is placed into a mold of one-step molding (i.e., the first mold) for brush head main body, and after injection molding, a combination of the brush head fixture and the brush head main body 10 is obtained. The brush head main body 10 is combined with the brush head fixture to form the retaining part 13 in the positioning hole 33. The outer wall of the retaining part 13 is in contact with the brush head fixture to ensure that the position of the retaining part 13 remains unchanged in subsequent processes. Specifically, the material injected into the first molding cavity is a hard plastic precursor used to form the hard brush head main body 10 to ensure the cleanliness of the toothbrush head.

Step S203: the brush head fixture and the brush head main body 10 are removed from the first mold and then fixed in a bristle implanting fixture, the bristles 11 are implanted and fixed in the retaining part 13 using the bristle implanting fixture, and the free end of the bristles 11 is accommodated in the bristle accommodating part 31.

Specifically, when the brush head fixture and the brush head main body 10 are removed from the first mold, the combination of the brush head fixture and the brush head main body 10 is removed as a whole, so that the brush head main body 10 does not need to be re-positioned by the brush head fixture before bristle implanting, which simplifies the process and has high alignment accuracy.

Taking the brush head main body and the brush head fixture described in the first embodiment as an example, as shown in FIG. 6, FIG. 6(a) is a schematic diagram of the combination of the toothbrush head with bristles and the brush head fixture from one side, and FIG. 6(b) is a schematic diagram of the combination of the toothbrush head with bristles and the brush head fixture from the other side. The retaining parts 13 are configured to fix the bristles 11 in the bristle implanting process. The bristle accommodating part 31 is located on one side of the retaining parts 13 and the brush head fixture, and is used to keep the bristles 11 being implanted during the bristle implanting process in a cavity, avoiding displacement and damage of the bristles 11 in subsequent processes.

The process of using the brush head fixture described in the second embodiment to implant bristles onto the brush head main body described in the second embodiment is similar to the above process, and will not be repeated.

As one of the embodiments, the step of S203 includes:
by using the bristle implanting fixture, one end of the bristles 11 is enabled to penetrate through the retaining part 13 positioned in the positioning hole 33 from the side of the material sealing surface 32 and extend into the bristle accommodating part 31; and
the end of the bristles 11 located on the side of the material sealing surface 32 is treated, so that the bristles 11 are fixed in the retaining part 13.

Here, the brush head fixture and the brush head main body 10 are fixed in the bristle implanting fixture, the bristles 11 are grabbed using a bristle extractor, the bristles 11 are pushed into the retaining part 13, and the tail of the bristles 11 is fused or glued together using hot pressing or adhesive methods to form the fixing end of the bristles 11. The retaining parts 13 of the brush head main body 10 are all fixed on the brush head fixture, enabling the bristles 11 to be accurately positioned with the bristle implanting fixture in the bristle implanting process, and the bristle extractor can align with the positioning hole 33 and accurately implant the bristles 11 into the retaining part 13.

Step S204: the combination of the brush head fixture and the brush head main body 10 after bristle implanting is removed from the bristle implanting fixture and then fixed in the second mold to cause a second molding cavity to be formed between the material sealing surface 32 and the second mold, and a coating layer 12 is formed in the second molding cavity by injection molding.

Taking the brush head main body and the brush head fixture described in the first embodiment as an example, as shown in FIG. 7, FIG. 7(a) is a schematic diagram of the combination of the toothbrush head with a coating layer and the brush head fixture from one side, and FIG. 7(b) is a schematic diagram of the combination of the toothbrush head with the coating layer and the brush head fixture from the other side. After the bristle implanting, the retaining parts 13 cooperate with the material sealing surface 32 of the brush head fixture to form a closed plane, which provides a stopping surface for the soft material during the second injection molding to prevent the soft material from entering the bristle accommodating part 31 and wrapping the bristles 11. Specifically, the material injected into the second molding cavity is a soft plastic precursor used to form the soft coating layer 12 to improve the comfort of the toothbrush head when entering the mouth.

The process of using the brush head fixture described in the second embodiment to form the coating layer through injection molding on the brush head main body described in the second embodiment is similar to the above process, and will not be repeated.

As one of the embodiments, the step of S204 further includes:
- a third molding cavity is formed between the bristle accommodating part 31 and the second mold, the third molding cavity is used to accommodate the bristles 11, and the third molding cavity and the second molding cavity are isolated from each other through the material sealing surface 32; and
- a soft plastic material is injected into the second molding cavity to obtain a toothbrush head.

Here, the brush head fixture is placed in the second mold, and the cavity of the second mold is divided into two parts, namely the second molding cavity and the third molding cavity. The third molding cavity is formed by the bristle accommodating part 31 cooperating with the second mold to receive the bristles 11. The second molding cavity is a cavity for filling soft material and configured for forming the coating layer 12. In this way, the bristles 11 are completely isolated from the soft material, thereby preventing the soft material from entering the bristles 11 during the injection molding process and wrapping the bristles 11, making the toothbrush head unusable, and causing the injection molded surface to be smoother and more aesthetically pleasing. Due to the high injection pressure in the molding cavity during the injection molding process, soft material can enter and fill small gaps to cause product defects. Therefore, using the brush head fixture made of metal or high hardness plastic during injection molding can not only resist the injection pressure in the molding cavity, but also achieve a high seamless cooperation with the metal material of the mold, thus achieving a complete stopping effect on the soft plastic material.

As one of the embodiments, after the step of S204, the method further includes:

the combination of the brush head fixture and the brush head main body 10 with the formed coating layer 12 is removed from the second mold;

the brush head main body 10 with the formed coating layer 12 is separated from the brush head fixture; and a toothbrush head is obtained after the brush head fixture is removed from the toothbrush head.

Here, the manufacturing of the toothbrush head is completed by sequentially forming the toothbrush head main body 10, the bristles 11 and the coating layer 12 of the toothbrush head using the brush head fixture. The brush head fixture is removed and demolded from the toothbrush head to obtain the finished toothbrush head.

The manufacturing method of the toothbrush head according to this embodiment includes: a brush head fixture is provided; the brush head fixture is fixed in a first mold to cause the wall of the positioning hole of the brush head fixture to cooperate with the first mold to form a first molding cavity, a brush head main body is formed in the first molding cavity through injection molding, and the retaining part on the brush head main body corresponds with the positioning hole and is positioned in the positioning hole; the brush head fixture and the brush head main body are removed from the first mold and then fixed in a bristle implanting fixture, the bristles are implanted and fixed in the retaining part using the bristle implanting fixture, and the free end of the bristles is accommodated in the bristle accommodating part; the combination of the brush head fixture and the brush head main body after bristle implanting is removed from the bristle implanting fixture and then is fixed in the second mold to cause a second molding cavity to be formed between the material sealing surface and the second mold, and a coating layer is formed in the second molding cavity by injection molding. In this way, the brush head fixture is used to participate in the entire production process of the toothbrush head, thereby simplifying the production process of the toothbrush head, ensuring accurate size matching between various components in the manufactured toothbrush head, and improving the production efficiency of the toothbrush head.

All the above embodiments are only specific embodiments of the present application, used to illustrate the technical solution of the present application, rather than limiting the present application. The scope of protection of the present application is not limited to this. Any equivalent modifications or replacements made by those skilled in the art to the technical solution described in the above embodiments are included in the scope of the claims of the present application.

INDUSTRIAL APPLICABILITY

The present application provides a brush head fixture for production of a toothbrush head and manufacturing method of the toothbrush head. The brush head fixture includes a fixture main body, a bristle accommodating part, a material sealing surface, and one or more positioning holes. One side of the fixture main body is provided with the bristle accommodating part, and the bristle accommodating part is configured for accommodating the free end of implanted bristles during the manufacturing process of the toothbrush head. The material sealing surface is located on one side of the fixture main body away from the bristle accommodating part, and the material sealing surface is configured for preventing the material of the coating layer from entering the bristle accommodating part when forming the coating layer. The positioning hole penetrates through the wall of the fixture main body between the material sealing surface and the bristle accommodating part. The positioning hole is configured for injection molding the retaining part, and also for positioning the retaining part obtained through injection molding. The brush head fixture includes parts corresponding to the brush head main body, the bristles and the coating layer, and one brush head fixture can be used to participate in the entire production process of the toothbrush head, thereby simplifying the production process of the toothbrush head, and ensuring accurate size matching between various components in the manufactured toothbrush head.

What is claimed is:

1. A manufacturing method of a toothbrush head, the toothbrush head comprising a brush head main body, bristles, and a coating layer, the brush head main body comprising one or more retaining parts, one end of the bristles being fixed by the retaining part, the coating layer covering at least a portion of the brush head main body away from the free end of the bristles, the manufacturing method comprising the following steps:
   S201: a brush head fixture is provided, wherein the brush head fixture comprises a fixture main body, a bristle accommodating part, a material sealing surface, and one or more positioning holes: wherein one side of the fixture main body is provided with the bristle accommodating part, the material sealing surface is located on one side of the fixture main body away from the bristle accommodating part, and the one or more positioning holes penetrate through the wall of the fixture main body between the material sealing surface and the bristle accommodating part;
   S202: the brush head fixture is fixed in a first mold to cause the wall of the positioning hole of the brush head fixture to cooperate with the first mold to form a first molding cavity, a brush head main body is formed in the first molding cavity through injection molding, and the retaining part on the brush head main body corresponds with the positioning hole and is positioned in the positioning hole;
   S203: the brush head fixture and the brush head main body are removed from the first mold and then fixed in a bristle implanting fixture, the bristles are implanted and fixed in the retaining part using the bristle implanting fixture, and the free end of the bristles is accommodated in the bristle accommodating part;
   S204: the combination of the brush head fixture and the brush head main body after bristle implanting is removed from the bristle implanting fixture and then is fixed in the second mold to cause a second molding cavity to be formed between the material sealing surface and the second mold, and a coating layer is formed in the second molding cavity by injection molding.

2. The manufacturing method as claimed in claim 1, wherein in the step of S202, the wall of the positioning hole of the brush head fixture forms a part of the first molding cavity corresponding to the outer wall of the retaining part.

3. The manufacturing method as claimed in claim 1, wherein the step of S203 includes:
   by using the bristle implanting fixture, one end of the bristles is enabled to penetrate through the retaining part positioned in the positioning hole from the side of the material sealing surface and extend into the bristle accommodating part; and
   the end of the bristles located on the side of the material sealing surface is treated, so that the bristles are fixed in the retaining part.

4. The manufacturing method as claimed in claim 1, wherein after the step of S204, the method further comprises:
   the combination of the brush head fixture and the brush head main body with the formed coating layer is removed from the second mold;
   the brush head main body with the formed coating layer is separated from the brush head fixture.

5. The manufacturing method as claimed in claim 1, wherein the material injected into the first molding cavity is a hard plastic precursor, and the material injected into the second molding cavity is a soft plastic precursor.

* * * * *